(12) United States Patent
Ruiz Bernabeu et al.

(10) Patent No.: US 12,220,899 B1
(45) Date of Patent: Feb. 11, 2025

(54) HONEYCOMB DECOUPLING SHEET

(71) Applicant: GURU USA LLC, Miami Beach, FL (US)

(72) Inventors: Francisco Javier Ruiz Bernabeu, Valencia (ES); Francisco Javier Ruiz Pérez, Valencia (ES); Francisco Ferrándiz, Valencia (ES); Alejandro Sisternes Pla, Valencia (ES)

(73) Assignee: GURU USA LLC, Miami Beach, FL (US)

( * ) Notice: Subject to any disclaimer, the term of this patent is extended or adjusted under 35 U.S.C. 154(b) by 0 days.

(21) Appl. No.: 18/792,633

(22) Filed: Aug. 2, 2024

(51) Int. Cl.
| | |
|---|---|
| *B32B 3/12* | (2006.01) |
| *B32B 3/30* | (2006.01) |
| *B32B 5/02* | (2006.01) |
| *E04F 15/18* | (2006.01) |
| *E04F 21/22* | (2006.01) |
| *F24D 3/14* | (2006.01) |

(52) U.S. Cl.
CPC ............ *B32B 3/12* (2013.01); *B32B 3/30* (2013.01); *B32B 5/022* (2013.01); *E04F 15/185* (2013.01); *E04F 21/22* (2013.01); *F24D 3/142* (2013.01); *F24D 3/146* (2013.01)

(58) Field of Classification Search
None
See application file for complete search history.

(56) References Cited

U.S. PATENT DOCUMENTS

| | | | | |
|---|---|---|---|---|
| 3,487,579 | A * | 1/1970 | Brettingen | A63H 33/086 446/128 |
| 4,574,541 | A * | 3/1986 | Raidt | E02D 31/02 52/796.1 |
| 4,889,758 | A * | 12/1989 | Rinkewich | B29D 24/00 52/789.1 |
| 5,255,482 | A * | 10/1993 | Whitacre | E04F 15/185 52/390 |
| 5,460,867 | A * | 10/1995 | Magnuson | E01C 13/083 405/38 |
| 5,489,462 | A * | 2/1996 | Sieber | E02D 31/02 52/302.1 |
| D383,253 | S * | 9/1997 | Semenuk | D30/120 |
| 5,822,937 | A * | 10/1998 | Mahony | E04F 13/14 52/366 |
| 9,890,959 | B2 | 2/2018 | Houle et al. | |

(Continued)

*Primary Examiner* — Phi D A
(74) *Attorney, Agent, or Firm* — KPIP Law, PLLC; Kimberly A Peaslee

(57) ABSTRACT

Honeycomb decoupling sheet, comprising a plurality of reliefs and concavities that form upper and lower planes, and comprises a tessellated shape with a repeating hexagonal geometric unit, comprising a first central prominence, which configures a first air chamber; a first concavity around the previous one; six second prominences corresponding to a third of the first prominence and located at the vertices of the unit and, a third of first concavity around each second prominence, and; six equidistant second concavities, with radial distribution with respect to the center of the unit, which determine a circular matrix between the first concavity and the thirds of first concavity, where the plurality of reliefs configures a lattice between the first and second concavities that forms a second continuous air chamber incommunicable with each first chamber, where the first and second concavities are incommunicable with each other.

8 Claims, 5 Drawing Sheets

(56) References Cited

U.S. PATENT DOCUMENTS

| | | |
|---|---|---|
| 10,859,274 B2 | 12/2020 | Bordin |
| 10,900,241 B2 | 1/2021 | Schluter |
| 10,968,641 B2 | 4/2021 | Gutjahr |
| 11,371,250 B2 | 6/2022 | Boyle |
| 11,725,399 B1 * | 8/2023 | Sennik .................... F24D 3/146 |
| | | 52/403.1 |
| 11,879,255 B2 | 1/2024 | Rittmann et al. |
| 2020/0141132 A1 * | 5/2020 | Cormier ................ A47G 27/02 |
| 2020/0392743 A1 * | 12/2020 | Bennett ..................... E04B 5/48 |

* cited by examiner

HONEYCOMB DECOUPLING SHEET

BACKGROUND OF THE INVENTION

The present invention relates to facing material installations on a substrate, specifically to a honeycomb decoupling sheet which is arranged as a separation between the two elements.

A facing is a layer of material placed over the substrate on a surface or structure to protect it from moisture, weather and other factors, as well as for decoration.

Movement differentials are generated between the facing material and the substrate due to the different nature of the materials, which respond differently to temperature variations because they have different expansion coefficients. Different degrees of humidity also cause different stresses in each type of material.

This is why an intermediate decoupling element is required, which is capable of protecting the substrate by waterproofing against water seepage and at the same time absorbing the different stresses between the substrate and the facing material.

The intermediate decoupling element is usually formed by a honeycomb sheet with a plurality of reliefs and concavities. This honeycomb sheet has at least one permeable layer adhered to one of its surfaces, generally to its underside, and of non-woven fabric material, which acts as a separation between the support and the honeycomb sheet.

In the installation, a first adhesion layer is placed on the substrate, normally formed by mortar or adhesive cement, which will be in contact with the layer of non-woven material adhered to the lower plane of the sheet. On the other side, a second bonding layer, mortar or tile adhesive cement, is placed on top of the sheet to fill the cavities in the sheet. And these concavities usually have undercuts to ensure the adhesion of the mortar or tile adhesive to the sheet.

In this technique, several honeycomb sheets are used for decoupling. For example, patent U.S. Ser. No. 11/371,250 disclosing a support plate with a laminate material having a plurality of recesses and a plurality of grooves arranged so as to contact and join two or more recesses. In addition, it has open grooves that expose part of the surface of the permeable layer bonded to the bottom surface of the sheet to provide a strong connection between the layers.

This patent focuses on creating a network of connections between the cavities or voids, forming a network for the arrangement of the filling material seeking a homogeneous load distribution. However, this breaks the continuity of the air circulation network below the sheet, which is necessary for ventilation, as the slots interfere with this network. In addition, this patent does not address any solution to withstand the shear stresses that occur on many surfaces by elements that exhibit a twisting motion about the facing element.

Another known example is patent US20170292278 in which a sheet with separate conformations emerging upward from a bottom plane and forming an upper support plane is disclosed. Some of these conformations are connected to each other by means of ventilation channels protruding upwards from the lower plane, with these channels not reaching the upper plane. It also features openings in the sheet to connect the layers.

The ventilation channels allow a continuous network of air circulation under the sheet, but it is necessary to make slots for this purpose, complicating the processing of the sheet.

The voids between formations are filled with tile adhesive cement and form a homogeneous load-distribution network.

However, this approach also fails to address the need to withstand shear stresses to which pavements are subjected when a vehicle or load element rotates on its surface.

It is for this reason that it is considered necessary to configure a honeycomb decoupling sheet with an effective decoupling effect under any type of stress and that presents a balance between the lower ventilation of the sheet and the amount of mortar placed on it, in order to achieve maximum effectiveness of the sheet.

DETAILED DESCRIPTION

The honeycomb decoupling sheet presented here is used for installation of facing materials on a substrate. In this installation there is a first adhesion layer between the substrate and the sheet and a second adhesion layer between the sheet and the facing material.

For its part, the sheet is impermeable and comprises a plurality of reliefs and concavities forming substantially parallel upper and lower planes of the sheet, and a layer of permeable material attached to the lower plane and suitable for contact with the first layer.

This sheet comprises a tessellated shape based on a repeating geometric unit in the shape of a regular hexagon.

Each sheet unit comprises a primary prominence located at the center of the unit. This primary prominence configures a first air chamber in its interior.

The unit also comprises a primary concavity arranged around the primary prominence such that the first air chamber within it configures a closed volume of air between the sheet and the layer of permeable material adhered to the bottom plane.

In addition, it comprises six secondary prominences, each of which is located at a vertex of the unit and corresponds to one third of the primary prominence. It also has a third primary concavity arranged around each secondary prominence.

Thus, the union of three units allows the formation of a complete primary prominence and primary concavity at each vertex confluence.

It also has six secondary concavities equidistant from each other, arranged with a radial distribution with respect to the center of the unit such that they determine a circular matrix between the primary concavity and the thirds of the primary concavity.

On the other side, the plurality of reliefs forms a network around the primary and secondary concavities that forms a second continuous air chamber that is incommunicable with each first chamber.

In addition, the first and second concavities do not communicate with each other and are suitable for containing the second layer material.

A significant improvement over the state of the art is achieved with the honeycomb decoupling sheet proposed here.

This is because a tessellated design is achieved with a matrix in which there are no gaps or overlaps between elements.

This sheet achieves a balanced solution between the lower ventilation spaces generated in the lower zone of the reliefs and the spaces destined to contain the filling of the second layer, which creates a support structure that homogeneously distributes the different loads supported.

The reliefs of this sheet are generated by the descent of the sheet in the adjacent areas to form the concavities, since the reliefs are formed by the contours that surround these concavities and form a lattice that forms a continuous air chamber that communicates in the lower space of the reliefs of the entire unit and thus, of the entire sheet, in which air can flow, dissipating vapor pressure and at the same time serve as drainage for possible accumulations of moisture.

It is not necessary to make grooves between the reliefs to communicate them because the reliefs themselves have a continuous configuration that communicates between them.

On the other hand, the primary prominences that are located in the center of the unit, as well as those formed by the union of second prominences at the junction of three units, also form an inner air chamber but this does not communicate with the existing chamber under the reliefs, but it is a closed chamber and isolated from the rest, that generates a volume of enclosed air that helps to break acoustic bands and therefore allows a reduction of noise transmission, improving the acoustic insulation response between spaces.

In addition, these primary prominences located inside the first concavities make it possible to reduce the volume of adhesive filler material on the sheet and increase the total area of undercuts, thus improving the gripping performance of the sheet and its response to tensile stresses.

The primary prominences can be coplanar with the reliefs or else they can be arranged at a different height, thus allowing to control the amount of bonding material used in the installation, as well as the existing counter-surface.

An important advantage of this sheet is that the second concavities are arranged in a radial pattern around the primary prominence.

Thus, during the fluctuation of dynamic loads such as torsion or rotational stresses projected from the facing material, this arrangement contributes to the induction of a homogeneous distribution of these loads and a better response to them.

The result is therefore a honeycomb decoupling sheet that achieves greater effectiveness than existing sheets, since it achieves a better distribution of loads with better induction to the movement or direction of the dynamic load forces, thus obtaining a higher performance of the sheet. In addition, this is achieved by optimizing the amount of bonding material for the top filler of the sheet, which generates higher efficiency.

BRIEF DESCRIPTION OF THE DRAWINGS

In order to help a better understanding of the characteristics of the invention, in accordance with a preferred example of its practical realization, a series of drawings is provided as an integral part of its description, which are illustrative and not limiting character, where the following has been represented.

DETAILED DESCRIPTION OF A PREFERRED EMBODIMENT OF THE INVENTION

Figure 1:
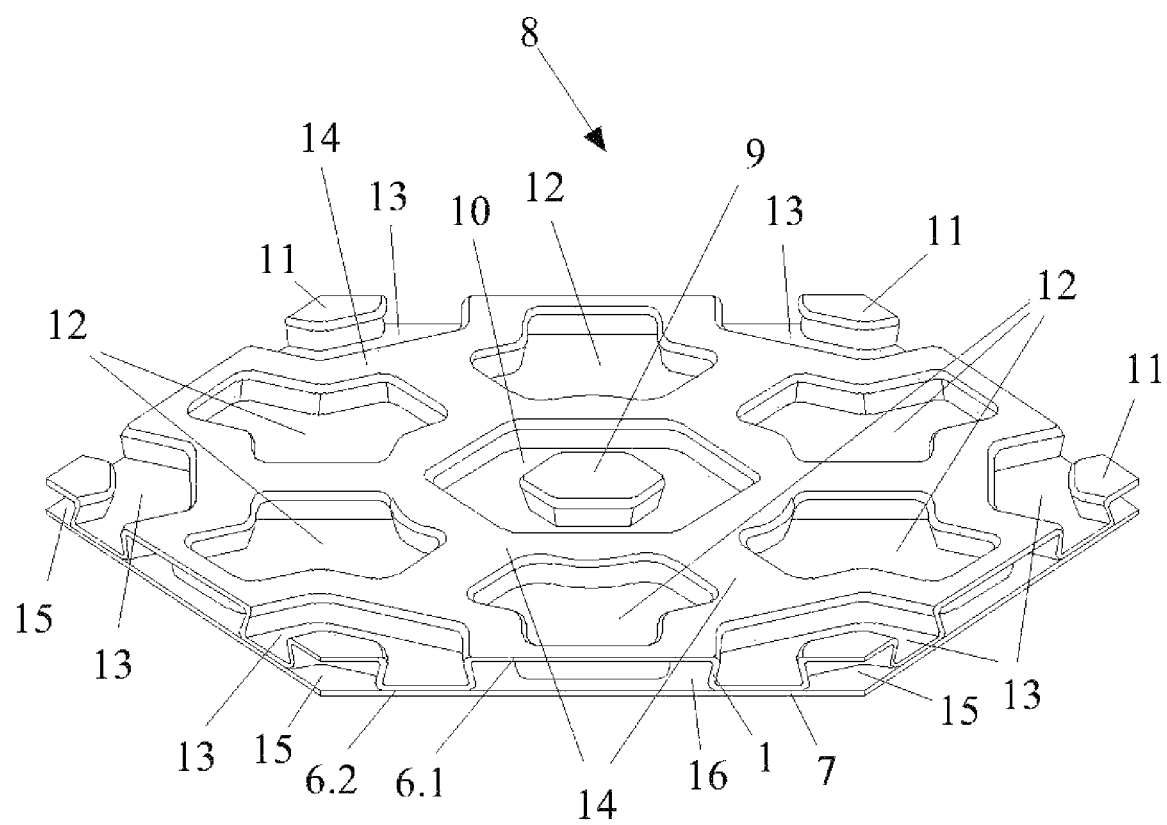
FIG. 1—Shows a perspective view of a geometrical unit of a repeating honeycomb decoupling sheet, for a first preferred embodiment of the invention.

From the figures provided, it can be seen how, in a first preferred embodiment of the invention, the honeycomb decoupling sheet proposed here is intended for the installation of facing materials (2) on a substrate (3). These installations consist of a first adhesion layer (4) between the substrate (3) and the sheet (1) and a second adhesion layer (5) between the sheet (1) and the facing material (2).

Figure 2:
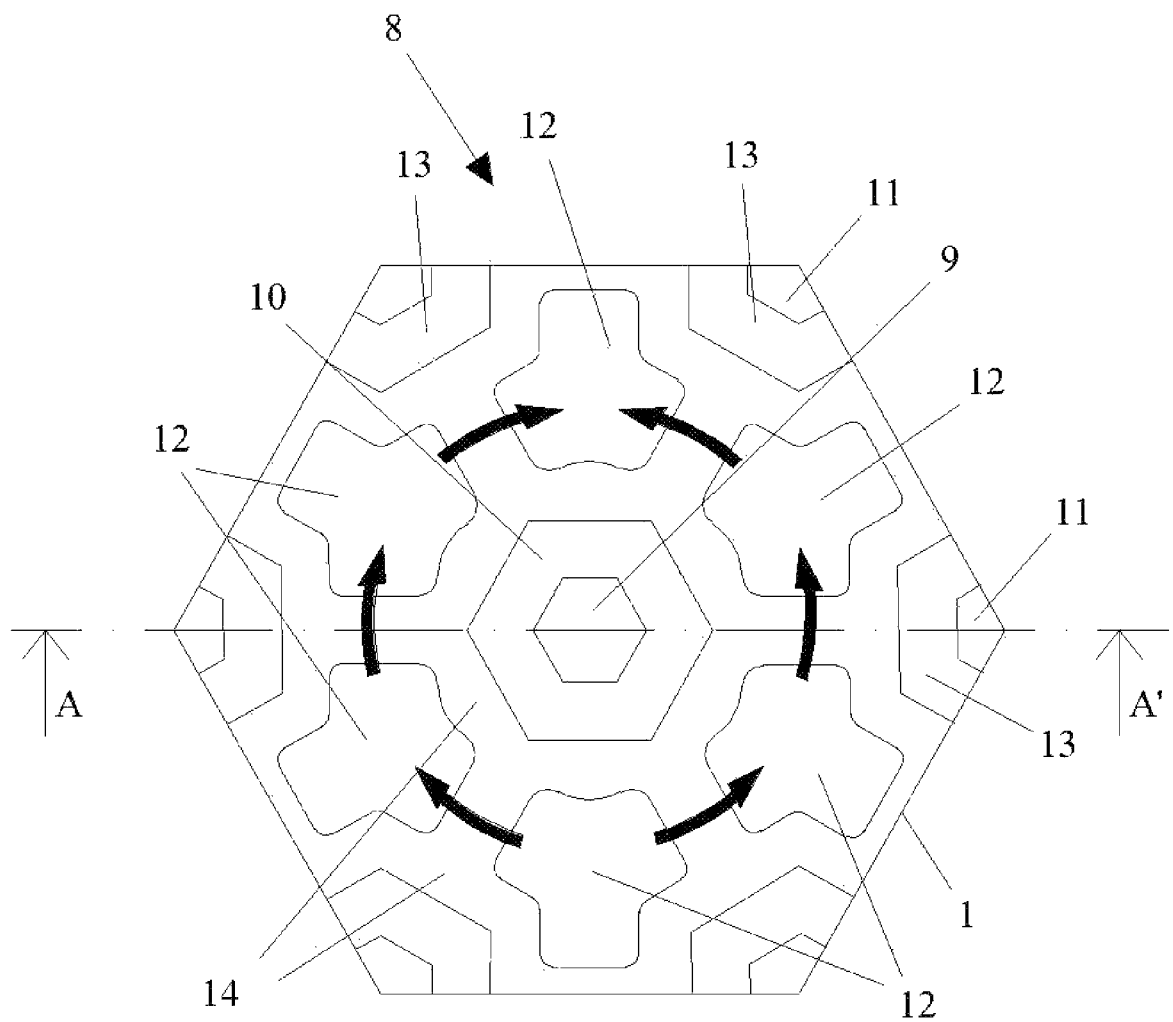
FIG. 2—Shows a plan view of a geometrical unit of a repeating geometrical unit of a honeycomb decoupling sheet, for a first preferred embodiment of the invention.
Figure 4:
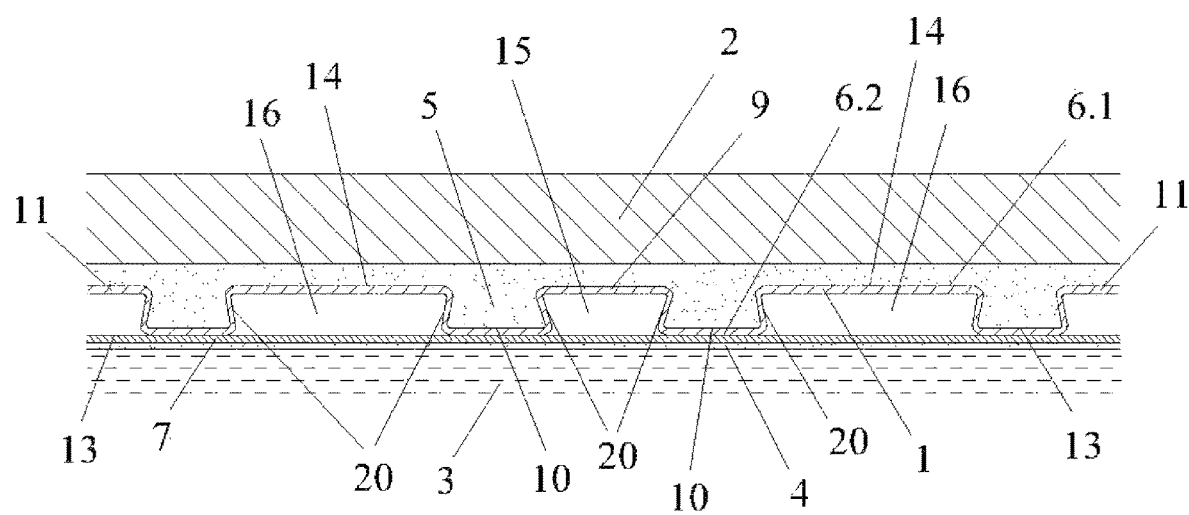
FIG. 4—Shows a view of section A-A' of the installation of an honeycomb decoupling sheet unit, for a first preferred embodiment of the invention.

The sheet (1) is waterproof and as shown in FIGS. 1, 2 and 4, comprises a plurality of reliefs and concavities forming substantially parallel upper and lower planes (6.1, 6.2) of the sheet (1). The sheet (1) further features a layer of permeable material (7) attached to the bottom plane (6.2) and suitable for contact with the first bonding layer (4).

In this first preferred embodiment the first and second bonding layer (4, 5) are formed by a cement glue. In other cases, other types of adhesives may be used.

For its part, in this case proposed here, the layer of permeable material (7) is preferably formed by a non-woven fabric, but in other cases it may be formed by a geotextile, a mesh or a net.

This sheet (1) comprises a tessellated shape from a repeating geometric unit (8), which is represented in FIG. 1, and which has the shape of a regular hexagon.

Each of these geometric units (8) comprises a first prominence (9) located in the center of the unit (8). This first prominence (9) configures a first air chamber (15) inside it.

In this example it has been considered preferably that the first prominence (9) has a regular polygon shape and preferably a hexagonal figure has been chosen, however, in other embodiments of the invention, this first prominence (9) can adopt a different shape, such as a pentagon shape, an octagon shape, or even more developed shapes such as a stellated polygon or any other non-polygonal shape.

Figure 3:
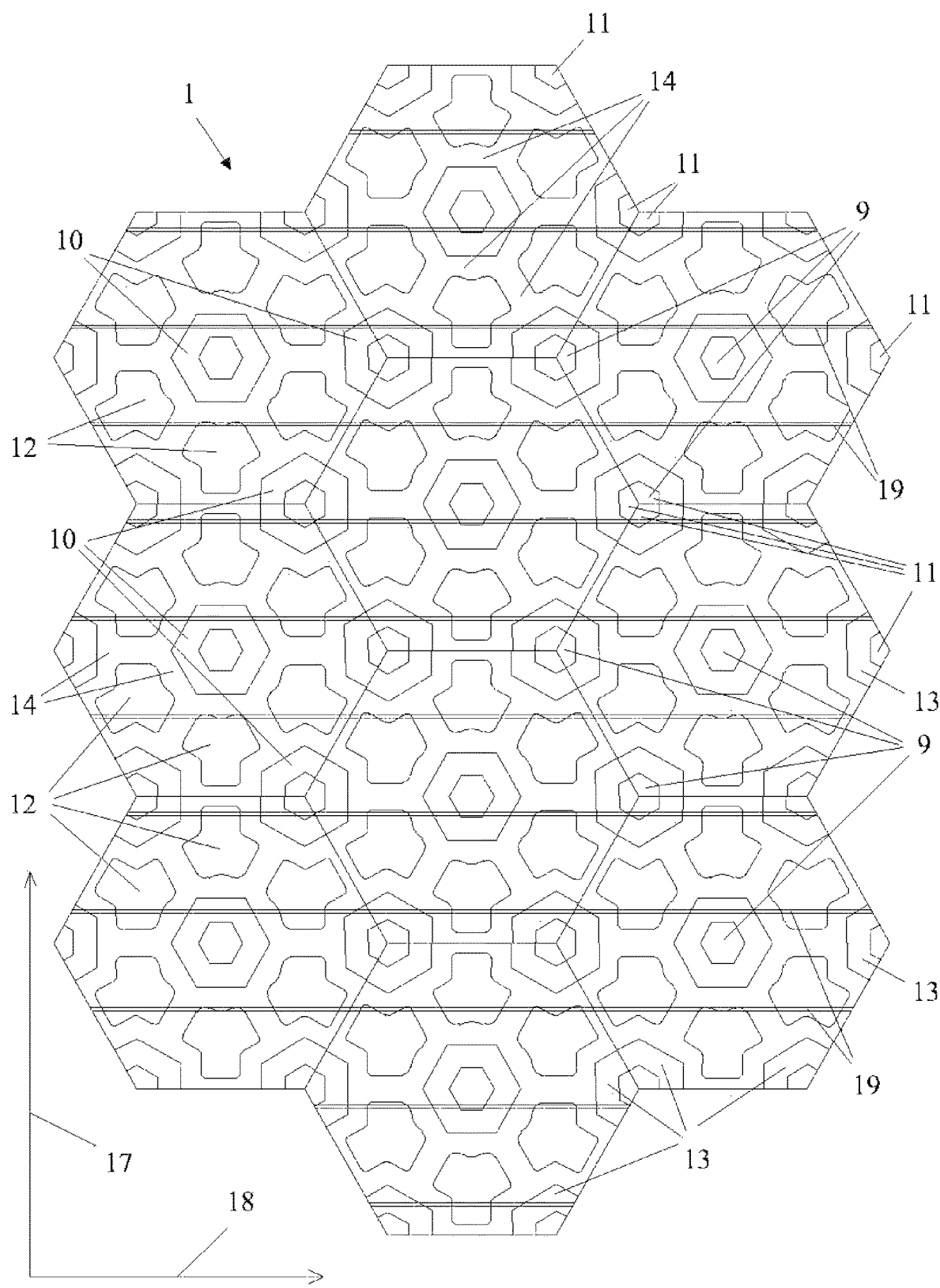
FIG. 3—Shows a plan view of a honeycomb decoupling sheet, for a first preferred embodiment of the invention.

As shown in FIGS. 1, 2 and 3, each unit (8) has a first concavity (10) arranged around the first prominence (9).

In this way, the first air chamber (15) located in the lower zone of the first prominence (9) is enclosed perimetrically by the first concavity (10) that determines the lower plane (6.2) of the sheet (1), forming in the first chamber (15) a closed volume of air between the sheet (1) and the layer of permeable material (7) adhered to the lower plane (6.2).

In addition, each unit (8) comprises six second prominences (11), located at a vertex of the unit (8) respectively. Each second prominence (11) corresponds to one third of the first prominence (9).

At the same time, it comprises a third (13) of first concavity arranged around each second prominence (11). Thus, as shown in FIG. 3, the union of three units (8) allows the formation of a complete first prominence (9) and first concavity (10) at each vertex joint.

The unit (8) further comprises six second concavities (12) equidistant from each other. They are arranged with a radial distribution with respect to the center of the unit (8) in such a way that they determine a circular array around it of as many elements as the unit (8) has sides, between the first concavity (10) and the thirds (13) of the first concavity.

FIGS. 1, 2 and 3 show that the plurality of reliefs (14) form a lattice around the first and second concavities (10, 12). These reliefs (14) form a second continuous air chamber (16) that is incommunicable with each first chamber (15).

In turn, the first and second concavities (10, 12) do not communicate with each other and are suitable for containing the filler material of the second bonding layer (5).

FIG. 3 shows that the sheet (1) has a longitudinal direction (17) and a transverse direction (18) and preferably, in one embodiment, comprises straight grooves (19), located in the upper plane (6.1) with a depth less than the distance between both upper and lower planes (6.1, 6.2), these grooves (19) being equidistant and parallel to the transverse direction (18).

These grooves (19) have the purpose of allowing a better articulation of the sheet (1) allowing a bending capacity to be able to roll it in its longitudinal direction (17). In addition, the grooves (19) allow a faster measurement of the length of the sheet (1), as they are located equidistant from each other.

In other embodiments the sheet (1) may not have these grooves (19), in which case its distribution is more convenient on plates.

In this first proposed embodiment, as shown in FIG. 4, the reliefs (14) and the first and second prominences (9, 11), preferably, comprise a counter-surface (20) formed by a sloping side surface all around. This inclination is such that the junction of the lateral surface with the lower plane (6.2) of the corresponding concavity is an acute angle.

These undercuts (20) allow the adhesive cement, used as a second bonding layer (5), to grip inside the first and second concavities (10, 12), preventing it from coming out.

In this example it has been preferably considered that the first and second prominences (9, 11) are coplanar with the upper plane (6.1) of the sheet (1), i.e. with the plane formed by the reliefs (14), but in other embodiments the first and second prominences (9, 11) may form an intermediate plane between the lower plane (6.2) and the upper plane (6.1) of the sheet (1).

This possibility of varying the height of the first and second prominences (9, 11) makes it possible to regulate the most suitable quantity of tile adhesive cement for filling the first concavities (10), depending on the specific case and the possible loads to which the pavement will be exposed.

From another aspect, FIGS. 1, 2 and 3 show that in this preferred embodiment, the first concavity (10) is hexagonal in shape. This should not be a limiting factor, since in other embodiments it may present a different shape as may be any other polygonal shape, which may coincide with the shape of the first prominence (9), as in this proposed case, or the first concavity (10) and the first prominence (9) may have different shapes.

Figure 5:
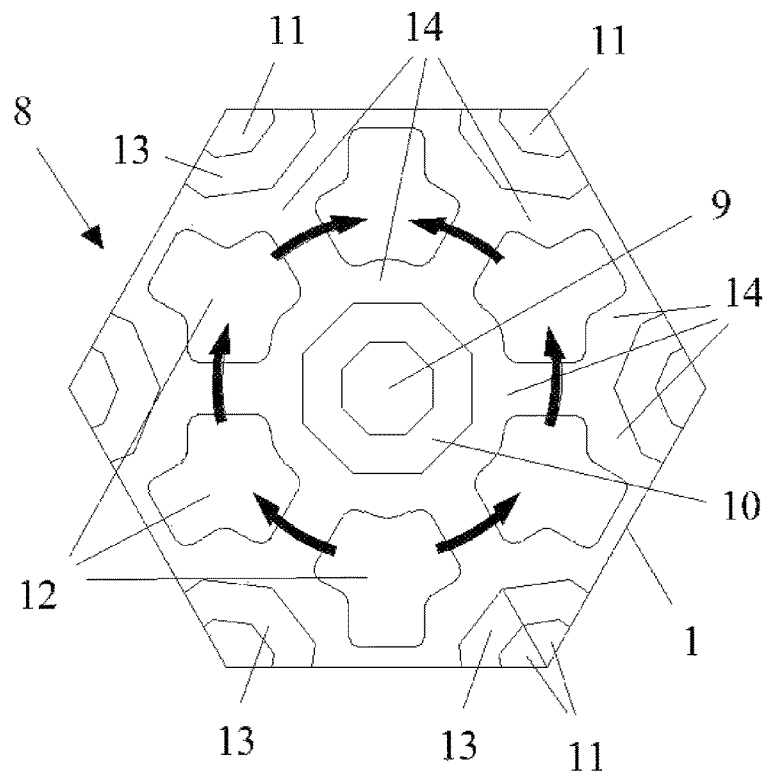
FIG. 5—Shows a plan view of a geometrical unit of a repeating honeycomb decoupling sheet, for a second preferred embodiment of the invention.

By way of example, FIG. 5 is provided in which a unit (8) of the sheet is shown for a second embodiment in which the first prominence (9) is in the form of a regular octagon just like the first concavity (10).

Figure 6:
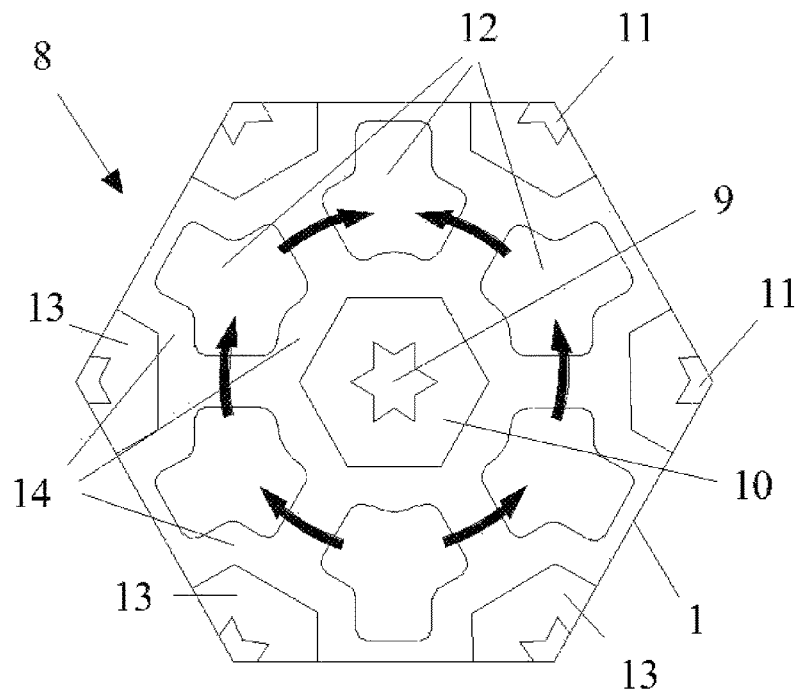
FIG. 6—Shows a plan view of a geometric unit of a repeating geometric unit of a honeycomb decoupling sheet, for a third preferred embodiment of the invention.

FIG. 6 is also provided, in which a third preferred embodiment of the invention can be observed, in which the first prominence (9) has the shape of a six-pointed star-shaped polygon, while the first concavity (10) has a hexagonal shape, thus different from that of the first prominence (9).

What is claimed:

1. A honeycomb decoupling sheet, for installation of facing materials on a substrate with a first bonding layer between the substrate and the sheet, and a second bonding layer between the sheet and the facing material, wherein the sheet is impermeable and comprises a plurality of reliefs and concavities forming substantially parallel upper and lower planes of the sheet, and a layer of permeable material attached to the lower plane and suitable for contact with the first layer, comprising:
    a tessellated shape from a repeating regular hexagon geometrical unit, wherein this unit comprises:
        a first prominence located in the center of the unit, which forms a first air chamber inside the unit;
        a first concavity arranged around the first prominence such that the first air chamber forms a closed volume of air between the sheet and the layer of permeable material adhering to the bottom plane;
        six second prominences, where each is located at a vertex of the unit and corresponds to one-third of the first prominence, and, one-third first concavity arranged around each second prominence, such that the union of three units permits the formation of a complete first prominence and first concavity at each joint of the vertices, and;
        six second concavities equidistant from each other arranged with a radial distribution with respect to the center of the unit such that they determine a circular array between the first concavity and the thirds of the first concavity;
    wherein the plurality of reliefs configures a lattice around the first and second concavities forming a second continuous air chamber incommunicable with each first chamber and, wherein the first and second concavities are incommunicable with each other and are suitable for containing the material of the second layer.

2. The honeycomb decoupling sheet according to claim 1, wherein the sheet has a longitudinal direction and a transverse direction and comprises straight grooves, located in the upper plane with a depth less than the distance between both planes, upper and lower, these grooves being equidistant and parallel to the transverse direction.

3. The honeycomb decoupling sheet according to claim 1, wherein the reliefs and prominences comprise an undercut formed by a lateral surface inclined all around, wherein this inclination is such that the junction of the lateral surface with the lower plane of the corresponding concavity is an acute angle.

4. The honeycomb decoupling sheet according to claim 1, wherein the prominences are coplanar with the upper plane of the sheet.

5. The honeycomb decoupling sheet according to claim 1, wherein the protrusions form an intermediate plane between the lower plane and the upper plane of the sheet.

6. The honeycomb decoupling sheet according to claim 1, wherein the first concavity is in the form of a regular hexagon.

7. The honeycomb decoupling sheet according to claim 1, wherein the first prominence is in the form of a regular polygon.

8. The honeycomb decoupling sheet according to claim 7, wherein the first prominence is in the form of a hexagon.

* * * * *